United States Patent [19]
Pospisil

[11] Patent Number: 5,454,572
[45] Date of Patent: Oct. 3, 1995

[54] MECHANICAL END FACE SEAL SYSTEM

[75] Inventor: Mark G. Pospisil, Park Ridge, Ill.

[73] Assignee: John Crane Inc., Morton Grove, Ill.

[21] Appl. No.: 300,940

[22] Filed: Sep. 6, 1994

Related U.S. Application Data

[63] Continuation of Ser. No. 926,851, Aug. 6, 1992, abandoned.

[51] Int. Cl.⁶ .................................................. F16J 15/34
[52] U.S. Cl. ............................................ 277/65; 277/96.1
[58] Field of Search ................... 277/96, 96.1, 96.2, 277/59, 65, 81 R

[56] References Cited

U.S. PATENT DOCUMENTS

| | | | |
|---|---|---|---|
| 2,623,357 | 12/1952 | Birmann . | |
| 2,853,020 | 9/1958 | Hollinger . | |
| 3,515,393 | 6/1970 | Metcalf | 277/96.2 |
| 3,527,465 | 9/1970 | Guinard | 277/96.1 |
| 3,572,727 | 3/1971 | Greiner . | |
| 3,715,169 | 2/1973 | Molis | 277/96 |
| 3,767,212 | 10/1973 | Ludwig | 277/96 |
| 3,856,077 | 12/1974 | Siegla | 277/96 |
| 3,894,741 | 7/1975 | McHugh | 277/96.1 |
| 4,212,475 | 7/1980 | Sedy | 277/96.1 |
| 4,268,044 | 5/1981 | Killian et al. | 277/59 |
| 4,272,084 | 6/1981 | Martinson et al. | 277/96 |
| 4,277,072 | 7/1981 | Forch | 277/96.2 |
| 4,290,611 | 9/1981 | Sedy | 277/93 SD |
| 4,377,290 | 3/1983 | Netzel | 277/65 |
| 4,416,458 | 11/1983 | Takenaka | 277/96.2 |
| 4,681,326 | 7/1987 | Kubo | 277/215 |
| 4,900,039 | 2/1990 | Kecker et al. . | |
| 5,076,589 | 12/1991 | Marsi | 277/65 |
| 5,213,340 | 5/1993 | Azibert et al. | 277/65 |
| 5,217,233 | 6/1993 | Pecht | 277/65 |
| 5,249,812 | 10/1993 | Volden et al. | 277/15 |

FOREIGN PATENT DOCUMENTS

| | | | |
|---|---|---|---|
| 1470969 | 4/1977 | Canada | 277/96.2 |
| 297381 | 7/1989 | European Pat. Off. . | |
| 0362642 | 4/1990 | European Pat. Off. . | |
| 8809456 | 12/1988 | WIPO . | |
| 9008911 | 8/1990 | WIPO . | |

*Primary Examiner*—Daniel G. DePumpo
*Attorney, Agent, or Firm*—Dorn, McEachran, Jambor & Keating

[57] ABSTRACT

An inner diameter pressurized mechanical end face seal includes at least one seal module with adjacent relatively rotating rings each having a radially extending face confronting the face of the other ring. At least one of the rings, preferably the rotating ring, has plural spiral grooves adjacent to or extending from the inner diameter of the ring whereby the fluid pressure from the inner diameter together with the centrifugal force of the rotating ring expel any fluid leaking from the seal outwardly from the sealed chamber with sufficient force to inhibit contaminants from outboard the seal ring interface area from entering the seal. The structure and material comprising one or both of the rings provides structural integrity to each ring, thereby permitting the inner diameter pressurized seal rings to withstand fluid pressures up to at least as high as 1200 psi. Preferably, the ring material is a composite plastic material, such as polyamide-imide.

5 Claims, 2 Drawing Sheets

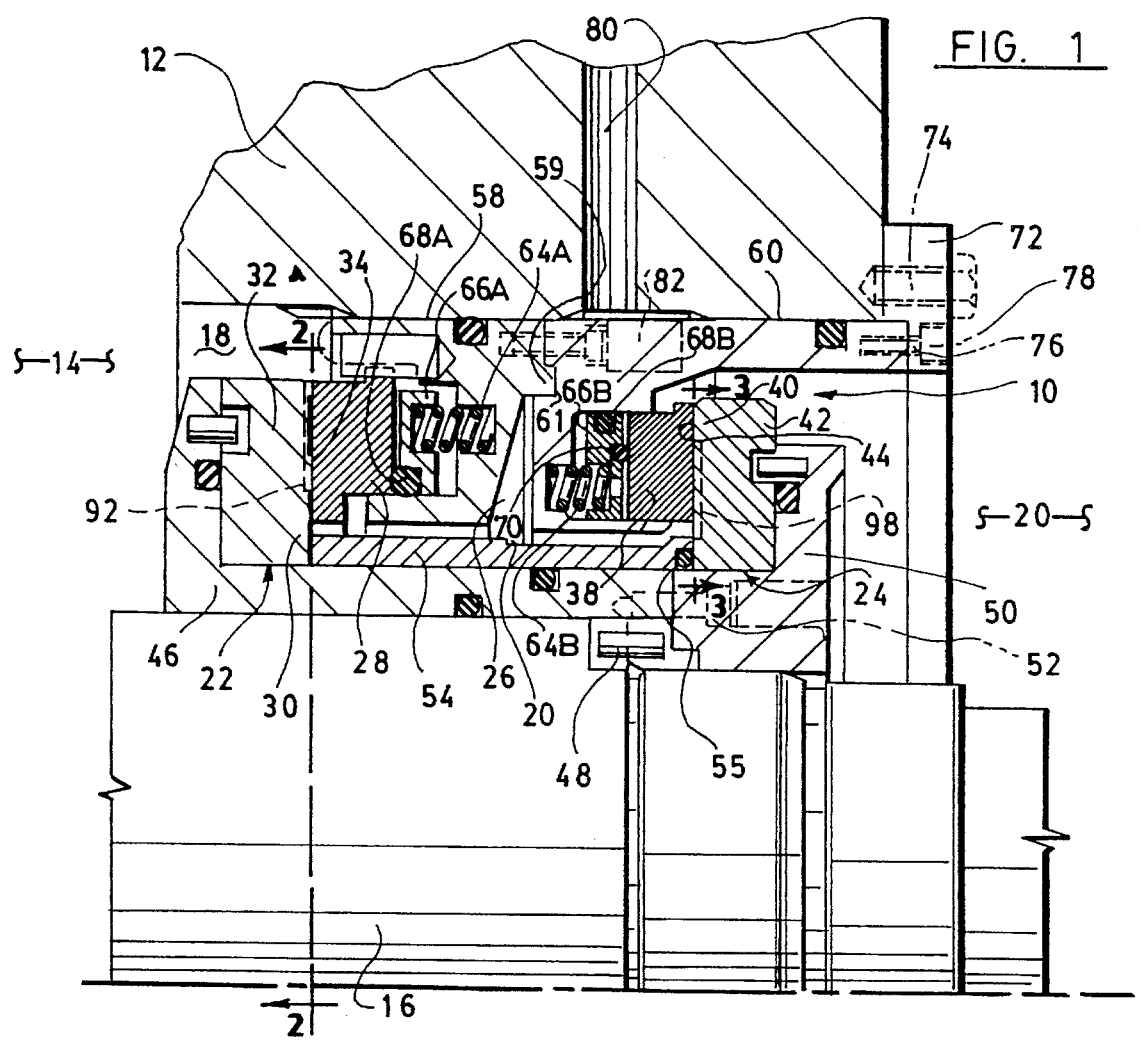
FIG. 1
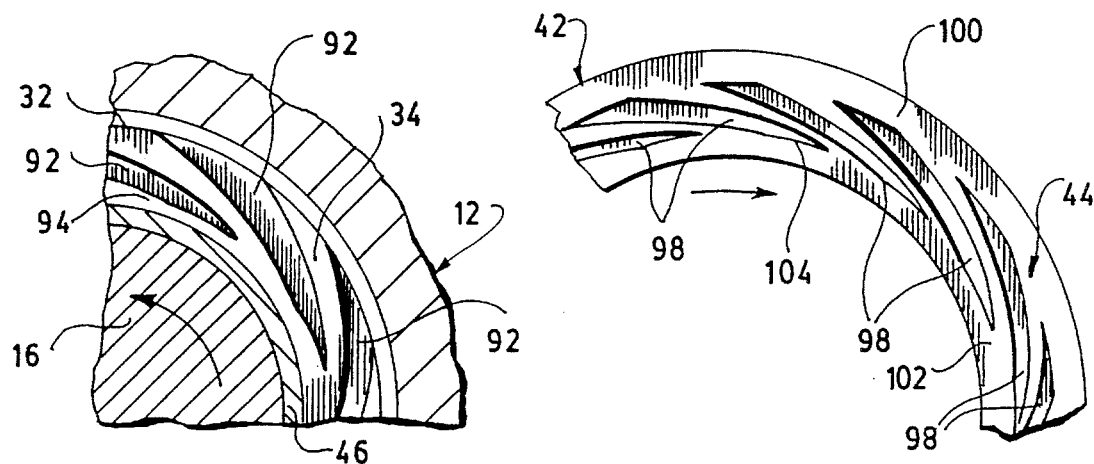
FIG. 2
FIG. 3

5,454,572

MECHANICAL END FACE SEAL SYSTEM

This is a continuation of Ser. No. 07/926,851, filed Aug. 6, 1992, now abandoned.

FIELD OF THE INVENTION

This invention relates generally to seal systems and more particularly to seal systems having at least one seal module for reducing or eliminating oil flow into the chamber sealed by the seal module.

BACKGROUND ART

Rotary mechanical end face seals having two adjacent relatively rotating rings have been used to seal fluids of many types, including gases, some of which are toxic or environmentally harmful, and liquids, such as highly volatile light hydrocarbon liquids. Some of these seals use specific configurations of the seal elements which include at least one ring having an end face with a plurality of spiral grooves for pumping fluid into a gap which arises between the end faces of the ring during seal operation. The spiral grooves extend at least partially into an area where the two rings are confronting each other, thereby defining an interface area.

Configurations are known in which seal systems have dual seal modules for sealing around the shaft. These configurations include a number of different arrangements in which the seal modules are in a dual or tandem configuration. Examples of dual sealing modules in a seal system can be found in U.S. Pat. No. 4,290,611, which is assigned to the assignee of the present invention.

In certain sealing system applications, the ambient environment is not necessarily atmosphere, but may comprise a fluid or even a liquid. For example, in some dual seal module arrangements, the shaft is mounted on an oil bearing, which includes oil as the fluid environment in the space immediately downstream of the second or outboard module. The oil in a seal having an outer diameter (O.D.) pressurized configuration with grooves extending from the O.D. tends to seep along the shaft and into the gap formed between the seal rings. As the oil meets the rotating ring, there is a tendency for the oil to cling to the ring material and to be propelled by the centrifugal force of the rotating ring. The oil then enters into the seal gap, thereby fouling the seal and causing imbalance in the components of the seal.

The possibility of disposing the grooves and pressurization along the inner diameter of the sealing faces has been suggested. However, it has been found that inner diameter (I.D.) pressure of a process fluid at a level slightly above atmospheric can cause a conventional carbon graphite primary ring to succumb to the excess pressure and to cause the ring to fracture and eventually come apart. Whereas the external pressure of an O.D. pressurized sealing module causes compressive forces which aid in maintaining the ring integrity, the I.D. pressurization operates in the opposite direction. Unless the I.D. pressurized ring includes some means to maintain its structural integrity, I.D. pressurization cannot provide a solution to the oil contamination problem.

What is thus needed is a seal configuration which avoids the problems caused by oil contamination in the seal by utilizing the centrifugal force of the rotating ring to impede the entry of oil into the seal gap rather than to aid such entry.

A further need arises for a ring for use in a rotary mechanical end face seal that is able to maintain its integrity and to continue operating under conditions of I.D. pressurized process fluid.

SUMMARY OF THE INVENTION

By this invention, a seal is provided with at least one seal ring having spiral grooves adjacent to or extending from the inner diameter of the ring, the seal being configured to have the process fluid pressure exerted on the inner diameter of the seal ring interface.

According to this invention, a rotary mechanical end face seal, providing fluid tight sealing between a housing and a shaft which is adapted to rotate relative to the housing, seals a fluid under pressure. The seal comprises adjacent annular primary and mating rings defining generally radial mating sealing faces, one of the rings being sealed and connected non-rotatably relative to the housing, coaxially of the shaft, and the other of the rings being sealed and connected coaxially of the shaft to rotate therewith, one of the rings being movable axially of the shaft, biasing means adapted to urge the axially movable ring toward the other ring, so as to bring the sealing faces close to one another and to have a rotatable sealing engagement relative to one another, the portions of each seal face which are adjacent the other seal face defining an annular seal interface area, the face of one of the rings having a plurality of spiral grooves extending from the inner diameter of the seal interface area and across at least a portion of said interface area, the spiral grooves pumping the fluid to be sealed across the seal interface area radially outwardly from the seal, whereby the centrifugal force being imparted to the sealed fluid by the rotating ring as the sealed fluid is being pumped radially outwardly in addition to the pressure of the sealed fluid inhibits contaminants found outboard the seal interface area from entering the seal.

One feature of this invention is to utilize a material for the primary rings which is capable of withstanding the hoop stresses generated by the I.D. pressure. Preferably the material will be able to withstand at least an amount of hoop stress corresponding to approximately 1200 psi fluid pressure on the inner diameter surface of the rings. Preferably, the rings comprise a material that is a composite plastic material, such as polyamide-imide.

BRIEF DESCRIPTION OF THE DRAWINGS

FIG. 1 is a cross-sectional view of a seal according to the present invention;

FIG. 2 illustrates in cross-section a portion of a seal face taken approximately along the line 2—2 of FIG. 1; and FIG. 3 illustrates in cross-section a portion of a seal face in the seal of FIG. 1 taken approximately along the line 3—3 of FIG. 1.

DESCRIPTION OF THE PREFERRED EMBODIMENTS

Figure 4:
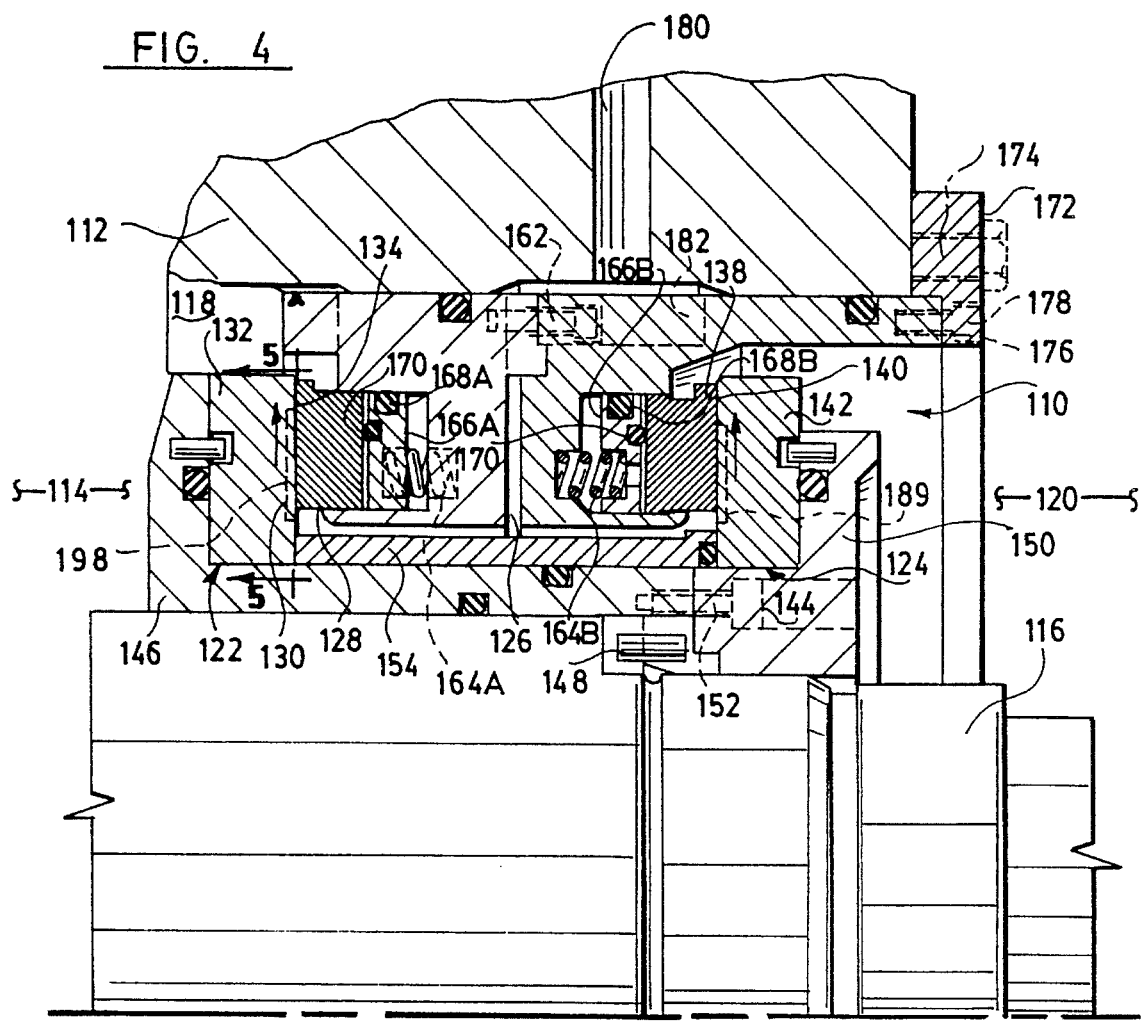
FIG. 4 is a cross-sectional view of a second embodiment of the present invention.

FIG. 1 illustrates a seal designated 10 constructed in accordance with one embodiment of this invention. The seal is designed to contain within the housing a pressurized process fluid such as a gas or a highly volatile carbon-based liquid. The housing is indicated at 12 enclosing the interior 14 of the device for which the seal is provided. Such a device may be a pump, a compressor or the like. A shaft 16 extends through an opening 18 in the housing 12 to the ambient environment 20.

Generally speaking, the seal 10 has a tandem arrangement of spiral groove mechanical end face seal modules, each module having portions thereof mounted on the housing and shaft. Each seal module is generally of the type shown in U.S. Pat. No. 4,212,475. The seal may include dual or double seal module arrangements. Alternatively, a single seal module, such as disclosed in U.S. Pat. No. 4,212,475, could be used to obtain the benefit of this invention. The disclosure of U.S. Pat. No. 4,212,475 is incorporated herein by reference for providing a disclosure of the pumping of fluid by each of the seals.

The tandem seals include an upstream or inboard seal module 22 and a downstream or outboard seal module 24 which define an annular chamber 26 between them. The inboard seal module 22 includes a pair of annular rings comprising an inboard primary ring 28 having a radially extending face 30 and an inboard mating ring 32 having a radially extending face 34 opposite the face 30 of the primary ring 28. Similarly, the outboard seal module 24 has a pair of annular rings comprising an outboard primary ring 38 having a radially extending face 40 and an outboard mating ring 42 having a radially extending face 44 opposite the face 40 of the primary ring 38.

The primary rings 28,38 are each affixed to the housing by a retainer assembly. Similarly, the mating rings 32,42 are affixed for rotation with the shaft 16 by one or more sleeve assemblies.

An inboard shaft sleeve 46 which fits upon the shaft 16 is held against rotation by a drive pin 48 or other means (not shown). Sleeve 46 is fixed to the shaft by appropriate means (not shown) to prevent outward axial motion of the sleeve. An O-ring is also positioned at a flanged portion of sleeve 46 to seal between the sleeve and shaft.

An outboard shaft sleeve 50 also fits upon the shaft 16 and adjoins the inboard shaft sleeve 46 so that adjoining surfaces of the two sleeves 46 and 50 do not permit fluid leakage between them. The connection between outboard shaft sleeve 50 and inboard shaft sleeve 46 is completed by an appropriate attachment means, such as a screw 52 (shown in phantom). The sleeves 46, 50 further include a spacer sleeve 54 which extends to and engages the radial surfaces 34,44 adjacent the inside diameter of the mating rings 32,42. Thus, the mating rings 32,42 are locked in place between the flanged portions of the respective shaft sleeves 46,50. An O-ring 55 seals between a shoulder in the spacer sleeve 54 and the ring face 42.

The seal 10 further comprises inboard and outboard retainers 58 and 60 for retaining inboard and outboard primary rings 28,38, respectively. Retainers 58 and 60 are connected to each other by an appropriate fastener, such as cap screws 62 (shown in phantom). The inboard retainer 58 mounts the inboard primary ring 28. The outboard retainer 60 similarly mounts the outboard primary ring 38. A protruding portion 59 of the inboard retainer 58 is shaped and dimensioned to conform to an annular groove 61 in the outboard retainer 60, so that when the cap screws 62 are tightened, retainer 60 becomes sealed against retainer 58.

Each retainer carries multiple springs 64A,64B and discs 66A,66B which urge the primary rings into engagement with the mating rings. The discs 66A,66B and springs 64A,64B permit primary rings 28 and 38 to move axially of the shaft 16. O-ring seals 68A,68B provide a secondary seal between discs 66A,68B and the respective retainers 58,60. The outboard seal assembly provides for another O-ring 70 for further secondary sealing between the disc 66B and the primary ring 38.

A gland plate 72 connects to housing 12. The plate is attached to the housing by screws 74 (shown in phantom). The gland plate has a flanged portion 76 for engaging the outer end face of the outboard retainer 60. The retainer 60 is connected to the flanged portion by cap screws 78 (in phantom). Suitable O-rings are provided as shown to seal the gland plate against the housing 12 and against the retainers 58,60.

A vent passage 80 communicates with an opening 82 in the retainer 60 and with chamber 26. The vent passage 80 is connectable to a flare stack or other combustion apparatus (not shown) for disposing of the controlled amount of gas passing across the rotating faces of upstream seal module 22. Such gas may, for example, be used for heating buildings associated with the apparatus containing the seal or the gas may be recompressed for other uses.

FIG. 2 shows a portion of a mating surface which may comprise either the mating ring or primary ring of the upstream or inboard seal module 22. The sealing, mating surface can be a conventional spiral groove surface according to the teaching found in U.S. Pat. No. 4,212,475. For purposes of description, the face 34 of mating ring 32 is shown. The face has a plurality of downstream pumping spiral grooves 92 extending from the outer circumference partially across the width of the face 34. An ungrooved annular surface defines a sealing dam 94 which provides a contacting static seal when the seal faces are not rotating relative to each other.

FIG. 3 shows a portion of a mating surface on either the mating ring or the primary ring of the downstream or outboard seal module 24. The sealing, mating surface is not identical to that of the sealing face 34 shown in FIG. 2, but instead has a grooved portion adjacent the inside diameter of the ring 42. The sealing mating surface may have a configuration similar to the grooved seal face shown in U.S. Patent No. 4,212,475 with the major obvious difference being the location of the grooves adjacent the inner diameter.

Also for purposes of description, the face 44 of mating ring 42 is shown. The face 44 also has a plurality of downstream pumping grooves 98 which are disposed adjacent the inner diameter of ring 42. Unlike the seal face shown in FIG. 2, which during rotation of the shaft is intended to pump fluid across the seal interface from the outer diameter toward the dam 94, which is disposed adjacent the inner diameter, the seal face shown in FIG. 3 pumps fluid across seal face 44 from the inner diameter of ring 42 toward the dam 100 which is disposed adjacent the outer diameter of the ring.

Another difference between mating seal ring faces 34 and 44 is in a second annular band 102 between the inner diameter of the ring 42 and the inner circumferential boundary 104 of the grooves 98. As used in the context of this invention, "adjacent the inner diameter" does not require the ends of grooves 98 to be contiguous with the inner diameter of ring 82. As can be seen in FIG. 3, the phantom lines which indicate the grooves 98 in ring 42 do not extend to the inner diameter of the ring. The portion of the face 44 which corresponds to annular band 102 abuts one end of the spacer sleeve 54. O-ring 56 seals the abutment between the ring face 42 and the spacer sleeve 54, and a smooth surface is provided by the annular band 102 for more effecting sealing by the O-ring. The grooves 98 do, however, extend beyond the interface area of the two rings 38,42 and into chamber 26. This configuration permits the grooves to more effectively pump the fluid from chamber 26 across the seal interface and out to the ambient environment 20.

In general, spiral grooves are conventionally disposed adjacent to or extending from the outer diameter of the rotating ring, as is shown in FIG. 2. It has been suggested in the prior art that the pumping effect would also be expected to arise in a configuration in which the spiral grooves are disposed on the stationary ring or on the rotating ring adjacent to or extending from the inner diameter of the seal ring. Spiral grooves disposed on the inner diameter also have been proposed by the assignee of the present invention for upstream pumping of an inert buffer fluid against the pressure of the process fluid which is sealed in the upstream chamber.

For inner diameter pressurized seal rings, however, considerations of outwardly directed hoop stress enter into the seal ring design. Specifically, carbon graphite rings which heretofore have been used in O.D. pressurized seals cannot normally withstand the radially outwardly directed hoop stresses which result from inner diameter pressurization and the rings are therefore susceptible to cracking or breaking when the seal is I.D. pressurized. In O.D. pressurized seals, the O.D. pressure provides compressive force on the ring radially inward from all directions and the ring is able to withstand this pressure. The compressive force strengthens the resistance of the ring, as by analogy, a semicircular arch is able to bear the weight of the arch resting on it.

For I.D. pressurized rings, however, the process fluid presents pressure that is exerted from the inner diameter outwardly, resulting in stress on the ring. This stress is sometimes referred to as hoop stress. The hoop stress generated by the outwardly directed pressure works against the ring, and subjects the ring to forces which tend to fracture the ring into pieces.

Referring again to FIG. 1, both seal modules 22 and 24 pump fluid downstream or from the side where fluid pressure is higher toward the lower pressure side. However, the fluid which is passing through inboard seal module 22 is propelled inwardly by the spiral grooves 92 of the rotating ring 32, whereas the fluid which is passing through the outboard seal module 24 is propelled outwardly from the seal interface because of the spiral grooves 98 and also because of centrifugal force imparted to the fluid by the rotation of ring 42. The direction of fluid flow in the radially outward direction which is imparted both by the fluid pressure differential and by the rotational centrifugal force of ring 42 greatly increases the resistance to upstream seepage of fluid flow in the opposite direction from that provided by the pumping action of the grooves 98. Thus, the seal configuration minimizes contaminants, such as oil, from entering the sealing gap.

Under normal use parameters, an O.D. pressurized stationary primary ring 28 is subject to structural stress from centrifugal and dynamic pressure forces. These forces are countered by the compressive resistance of the primary ring, which resistance increases with increasing inwardly directed force. However, in an I.D. pressurized configuration, a carbon graphite primary ring is subject to an outwardly directed pressure on its inner circumferential surface which is not countered by the tensile resistance of the material. Thus, to maintain structural integrity, the primary ring must be capable of withstanding pressures in excess of 1200 psi. Current typical primary rings made of carbon graphite material are very fragile when used in this fashion.

One feature of the present invention is thus providing a primary ring comprising a material which can withstand pressures normally encountered in pumps or compressors. The invention contemplates that certain types of composite plastic materials, such as polyamide-imide, commercially available under the trade name TORLON from Amoco Torlon Products of Atlanta, Ga., can be used in the manufacture of the primary rings, and in certain applications, also of the mating rings. TORLON is known to be approximately three times stronger than carbon graphite in withstanding the hoop stress which results from inner diameter fluid pressures of great magnitude, i.e., up to about 1200 psi.

Another dual seal arrangement in which the features of the present invention may be incorporated is a seal in which the buffer fluid is disposed in an intermediate chamber between two seal modules. Such an arrangement is illustrated in FIG. 4. The buffer fluid seal modules are also disposed upstream and downstream, respectively, of each other.

The seal 110 is constructed in accordance with another embodiment of this invention, and in many respects the seal 110 is similar in construction and operation to seal 10 (FIG. 1). Where possible, similar elements in each of the seals have been indicated with similar identification numerals by adding one hundred for the identification numerals in seal 110, so that the numerals correspond to the numerical sequence of the seal elements of seal 10 shown in FIG. 1.

The housing 112 encloses the interior chamber 114 of the device for which the seal 110 is provided. A shaft 116 extends through an opening 118 in the housing 112 and to the ambient environment 120.

The upstream or inboard seal module 122 and the downstream or outboard seal module 124 define an annular chamber 126 between them. The inboard seal module 122 includes a pair of annular rings comprising an inboard primary ring 128 having a radially extending face 130 and an inboard mating ring 132 having a radially extending face 134 opposite the face 130 of the primary ring 128. Similarly, the outboard seal module 124 has a pair of annular rings comprising an outboard primary ring 138 having a radially extending face 140 and an outboard mating ring 142 having a radially extending face 144 opposite the face 140 of the primary ring 138.

The primary rings 128,138 are each affixed to the housing by a retainer assembly. Similarly, the mating rings 132,142 are affixed for rotation with the shaft 116 by one or more sleeve assemblies.

An inboard shaft sleeve 146 which fits upon the shaft 116 is held against rotation by a drive pin 148 or by other means (not shown). Sleeve 146 is fixed to the shaft 116 by appropriate means (not shown) to prevent outward axial motion of the sleeve. An O-ring is also positioned at a flanged portion of sleeve 146 to seal between the sleeve and shaft.

An outboard shaft sleeve 150 also fits upon the shaft 116 and adjoins the inboard shaft sleeve 146 so that adjoining surfaces of the two sleeves 146 and 150 do not permit fluid leakage between them. The connection between outboard shaft sleeve 150 and inboard shaft sleeve 146 is completed by an appropriate attachment means, such as by cap screws 152 (shown in phantom). The sleeve assemblies 146,150 further include a spacer sleeve 154 which extends to and engages the radial surfaces 134,144 adjacent the inside diameter of the respective mating rings 132,142. Thus, the mating rings 132,142 are locked in place between the flanged portions of the respective shaft sleeves 146,150. An O-ring 156 is also provided for sealing between the spacer sleeve 154 and the ring face 144, similar to the arrangement in seal 10, (FIG. 1).

The retainer assembly comprises inboard and outboard retainers 158 and 160 for retaining the inboard and outboard primary rings 128,138, respectively. Retainers 158 and 160 are connected to each other by cap screws 162 (one of which is shown in phantom). The inboard retainer 158 mounts the inboard primary ring 128. The outboard retainer 160 similarly mounts the outboard primary ring 138. A protruding portion 159 of inboard retainer 158 is shaped and dimensioned to conform to an annular groove 161 in the facing portion of outboard retainer 160. Tightening of cap screws 162 attaches the outboard retainer 160 to the inboard retainer 158.

Each retainer carries multiple springs 164A,164B and discs 166A,166B which urge the primary rings into engagement with the mating rings. The discs 166A,166B and springs 164A,164B permit primary rings 128 and 138 to move axially of the shaft 116. O-ring seals 168A,168B provide a secondary seal between discs 166A,168B and the respective retainers 158,160. Another O-ring 170 is provided in each module for further secondary sealing between each disc 166A,166B and each primary ring 128,138.

A gland plate 172 connects to housing 112. The gland plate is attached to the housing by screws 174. The gland plate has a flanged portion 176 engaging the outer end face of the outboard retainer 160. The flanged portion 176 is connected to the retainer 160 by cap screws 178. Suitable O-rings are provided, as shown, to seal the gland plate against the housing 112 and the retainers 158,160.

The spacer sleeve 154 is dimensioned to provide enough clearance between the retainers 158,160 to define a space for intermediate chamber 126. Intermediate chamber 126, which may also be called the buffer chamber, lies between the two seal modules 122 and 124 and between the retainers 158,160. The seal modules 122,124 seal chamber 126 from the process fluid chamber 114 and from the ambient environment 170, respectively.

A buffer fluid passage 180 extends through the housing 112 to a buffer fluid pot (not shown). The buffer fluid passage 180 communicates with an opening 182 (shown in phantom) which provides fluid communication between the buffer fluid passage 180 and the intermediate seal chamber 126.

Another significant difference between the seal 10 embodiment shown in FIG. 1 and the seal 110 embodiment shown in FIG. 4 is that seal 10 has a vent 80 for venting process fluid out from the intermediate chamber 26. The seal 110, on the other hand, has a buffer fluid passage which provides an inert buffer fluid, such as nitrogen gas, into the intermediate chamber 126 from the buffer fluid pot (not shown). Moreover, in seal 10 the process fluid in housing 14 is at the highest pressure and is at a higher pressure than the intermediate chamber 26. In seal 110, on the other hand, the buffer fluid in chamber 126 and is maintained at a higher pressure than either the process fluid in chamber 114 or the ambient pressure at 120.

Figure 5:
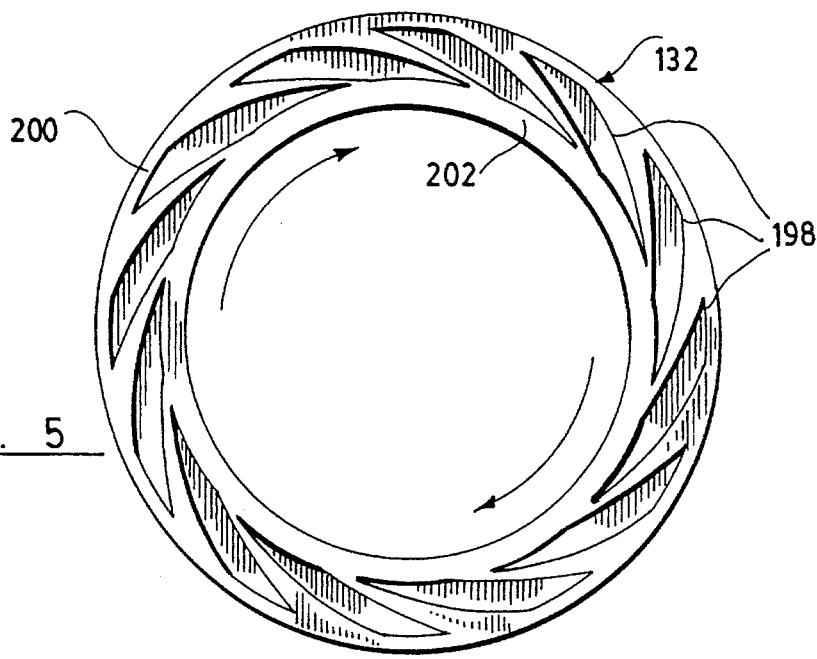
FIG. 5 illustrates a front view of a seal face taken approximately along the line 5—5 of FIG. 4.

Both the rotating mating seal rings 132 and 142 have spiral grooves which are adjacent the inner diameter. As shown in FIGS. 4 and 5, the spiral grooves do not extend to the edge of the inner diameter of mating rings 132,142, but the spiral grooves 198 (FIG. 4) extend at least partially into the intermediate chamber 126 formed between the two seals, so that the mating rings 132,142 both have a similar configuration to ring 42 (FIGS. 1 and 3). An outer diameter dam 200 is provided against which grooves 198 pump fluid.

During operation of the seal 110, the spiral grooves 198 of ring 132 pump buffer fluid across the seal interface between the faces 130 and 134, from the inner diameter to the outer diameter of the seal rings, and into the housing chamber 114. An inner diameter annular band 202 provides a sealing surface for an O-ring between band 202 and spacer sleeve 154.

The buffer fluid pressure in chamber 126 is also greater than the pressure of the process fluid in chamber 114. Thus, the pressure differential further aids the leakage of the buffer fluid across the seal interface and into the process fluid chamber 114. It is contemplated that seal 110 is for use in specific conditions where it is important that no leakage of the process fluid occur, and where the contamination of the process fluid by an inert buffer fluid does not present a difficulty. An appropriate use of this type of seal may be in the sealing or pumping of a process fluid which is toxic. Use of a nitrogen gas buffer fluid may be acceptable because the nitrogen will not react with other reactants in the process fluid and also because nitrogen will not interfere with any proposed use of the process fluid.

At the outboard seal module 124, the spiral grooves are also disposed adjacent the inner diameter of mating ring 142 to provide pumping of the buffer fluid from the intermediate chamber 126 across the seal interface to the ambient environment 120. The operation of seal module 124 is similar to that described above in relation to seal module 24 (FIG. 1). The inner diameter higher pressure of the buffer fluid chamber 126 relative to the pressure of the ambient environment 120, as well as the centrifugal force of the rotating mating ring 142, inhibit leakage of fluid, such as bearing oil, from traveling upstream. The seal configuration also avoids or prevents contamination of the seal which may result from fluid seepage from the ambient chamber 120 into the gap between the seal faces.

What is claimed is:

1. A tandem mechanical end face seal for providing fluid tight sealing between a housing and a shaft rotating relative to the housing, the seal providing sealing for a process fluid under pressure, and comprising:

a) an upstream seal module having a primary ring with a generally radially extending seal face, a mating ring with a generally radially extending seal face shaped and dimensioned to be in opposite mating relationship to the seal face of said upstream seal module primary ring, the portions of each said seal ring face which sealingly engage the other seal ring face defining an upstream seal interface, one of the rings being sealed to and nonrotatably connected with the housing, coaxially with said shaft, and the other of the rings being sealed to and connected coaxially with the shaft to rotate therewith, one of the rings being movable axially relative to the shaft, the upstream seal module further including a biasing means for urging the axially movable ring toward the other ring to bring the seal faces close to each other and to have a rotatable sealing engagement relative to one another, the face of one of said rings of said upstream seal module having a plurality of spiral grooves extending from the outer diameter of said one upstream seal ring and across at least a portion of said upstream seal interface, at least a portion of the spiral grooves being in contact with the process fluid to be sealed, and said spiral grooves being shaped and dimensioned to pump process fluid during shaft rotation from the pressurized process fluid contained within said housing toward said inner diameter of said seal;

b) a downstream seal module having a primary ring with a generally radially extending seal face, a mating ring with a generally radially extending seal face shaped and dimensioned to be in opposite mating relationship to the seal face of said downstream seal module primary ring, the portions of each said seal ring face which sealingly engage the other seal ring face defining a downstream seal interface, the inner diameter of each of said primary and mating rings being exposed to the fluid being sealed by said downstream seal module, one of the rings being sealed to and nonrotatably connected with the housing, coaxially with said shaft, and the other of the rings being sealed to and connected coaxially with the shaft to rotate therewith, one of the rings being movable axially relative to the shaft, the downstream seal module further including a biasing means for urging the axially movable ring toward the other ring to bring the seal faces close to each other and to have a rotatable sealing engagement relative to one another, the face of one of said rings of said downstream seal module having a plurality of spiral grooves extending from the inner diameter of said one ring and across at least a portion of said downstream seal interface and each said relatively rotatable rings of said downstream seal module being shaped, dimensioned and adapted to withstand inner diameter fluid pressure of at least 600 psi.; and c) an annular buffer fluid chamber defined by said upstream and downstream seal modules, said buffer fluid chamber containing a buffer fluid wherein at least a portion of the spiral grooves of said at least one downstream seal module seal ring face being exposed to and in contact with the buffer fluid in said buffer chamber, and said spiral grooves being shaped and dimensioned to pump fluid during shaft rotation from the buffer fluid chamber and towards the atmosphere external to said housing.

2. The seal according to claim 1 wherein each said relatively rotatable ring of said downstream seal module is shaped, dimensioned and comprises a material which is adapted to withstand inner diameter fluid pressure of at least 1000 psi.

3. The seal according to claim 1 wherein said relatively rotatable ring of said downstream seal module is shaped, dimensioned and comprises a material which is adapted to withstand inner diameter fluid pressure of at least 1200 psi.

4. The seal according to claim 1 wherein at least one of said downstream relatively rotatable rings comprises a material taken from the group of composite plastic materials.

5. The seal according to claim 4 wherein at least one of said relatively rotatable rings comprises polyamide-imide.

* * * * *